United States Patent
Ouyang et al.

(10) Patent No.: US 10,038,604 B2
(45) Date of Patent: Jul. 31, 2018

(54) PROCESSING METHOD AND APPARATUS FOR SIGNALING TRACING

(71) Applicant: ZTE Corporation, Shenzhen, Guangdong (CN)

(72) Inventors: Xiang Ouyang, Shenzhen (CN); Junchen He, Shenzhen (CN); Xiaojian Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/917,399

(22) PCT Filed: Jun. 13, 2014

(86) PCT No.: PCT/CN2014/079824
§ 371 (c)(1),
(2) Date: Mar. 8, 2016

(87) PCT Pub. No.: WO2015/035809
PCT Pub. Date: Mar. 19, 2015

(65) Prior Publication Data
US 2016/0218941 A1    Jul. 28, 2016

(30) Foreign Application Priority Data
Sep. 11, 2013    (CN) .......................... 2013 1 0413187

(51) Int. Cl.
*G06F 15/177* (2006.01)
*H04L 12/26* (2006.01)
(Continued)

(52) U.S. Cl.
CPC ............ *H04L 43/045* (2013.01); *H04L 41/08* (2013.01); *H04L 41/0803* (2013.01); *H04W 24/08* (2013.01)

(58) Field of Classification Search
USPC ........................................................ 709/220
See application file for complete search history.

(56) References Cited

U.S. PATENT DOCUMENTS 5,768,382 A * 6/1998 Schneier ................. A63F 13/12
380/251
6,012,088 A * 1/2000 Li ........................ G06F 9/44505
709/219
(Continued)

FOREIGN PATENT DOCUMENTS

CN        101163312 A    4/2008
CN        101170437 A    4/2008
(Continued)

OTHER PUBLICATIONS

Int. Search Report cited in PCT Application No. PCT/CN2014/079824 dated Aug. 22, 2014, 6 pgs.
(Continued)

*Primary Examiner* — Alicia Baturay
(74) *Attorney, Agent, or Firm* — Cooper Legal Group, LLC

(57) ABSTRACT

A method and apparatus for processing signalling tracing are provided. The method includes the following steps: a client reads a configuration file corresponding to a traced service (101); the client establishes a connection to a server (102); based on the configuration file, the client registers with the traced service in the server; after registration is successful, the client receives a signalling tracing message fed back by the server about the traced service (103); and the client outputs the signalling tracing message to a display interface (104).

20 Claims, 2 Drawing Sheets

(51) Int. Cl.
*H04W 24/08* (2009.01)
*H04L 12/24* (2006.01)

(56) References Cited

U.S. PATENT DOCUMENTS

| | | | | |
|---|---|---|---|---|
| 6,092,118 | A * | 7/2000 | Tsang | H04L 69/18 709/207 |
| 6,634,010 | B2 * | 10/2003 | Ishigami | G06F 17/5045 700/100 |
| 6,862,557 | B2 * | 3/2005 | Jones | H01L 22/20 257/E21.525 |
| 6,965,597 | B1 * | 11/2005 | Conway | H04L 41/145 370/389 |
| 7,117,258 | B2 * | 10/2006 | Lee | H04L 29/12311 709/222 |
| 7,162,403 | B2 * | 1/2007 | Nouri | G06F 17/5022 703/14 |
| 7,934,660 | B2 * | 5/2011 | Yeakley | G06F 17/2247 235/462.01 |
| 8,074,249 | B2 * | 12/2011 | Shikata | H04N 7/17318 725/109 |
| 8,504,687 | B2 * | 8/2013 | Maffione | H04L 41/06 370/395.2 |
| 8,516,421 | B1 * | 8/2013 | Ben-Tzur | G06F 17/5022 703/14 |
| 8,751,870 | B2 * | 6/2014 | Rajarao | G06F 11/3676 714/32 |
| 8,978,071 | B2 * | 3/2015 | Kim | H04N 21/4788 725/10 |
| 8,997,091 | B1 * | 3/2015 | Watson | G06F 8/60 717/170 |
| 9,026,132 | B2 * | 5/2015 | Wijayanathan | H04W 4/021 455/181.1 |
| 9,251,296 | B2 * | 2/2016 | Haub | G06F 17/30997 |
| 9,514,217 | B2 * | 12/2016 | Jagadish | G06F 17/30619 |
| 2005/0033777 | A1 * | 2/2005 | Moraes | G06F 17/30575 |
| 2009/0141642 | A1 | 6/2009 | Sun | |
| 2009/0185666 | A1 * | 7/2009 | Tang | H04L 41/5009 379/32.05 |
| 2009/0186643 | A1 * | 7/2009 | Yuan | H04W 4/14 455/466 |
| 2010/0281308 | A1 | 11/2010 | Xu | |
| 2012/0329450 | A1 | 12/2012 | Liu | |
| 2013/0150008 | A1 | 6/2013 | Huang | |
| 2015/0350938 | A1 * | 12/2015 | Heikkila | H04L 43/50 370/252 |

FOREIGN PATENT DOCUMENTS

| | | |
|---|---|---|
| CN | 101222738 A | 7/2008 |
| CN | 101242612 A | 8/2008 |
| CN | 101667928 A | 3/2010 |
| CN | 102196392 A | 9/2011 |
| CN | 102196394 A | 9/2011 |
| CN | 102739422 A | 10/2012 |
| EP | 2026503 A1 | 2/2009 |
| WO | 2012024916 A1 | 3/2012 |

OTHER PUBLICATIONS

Written Opinion cited in PCT Application No. PCT/CN2014/079824 dated Sep. 22, 2014, 11 pgs.
Supplementary European Search Report in European application No. 14844382.3, dated Aug. 30, 2016, 8 pgs.
William Salusky"Home . ellzey/rpcap Wiki . GitHub", Sep. 13, 2010(Sep. 13, 2010).XP055295615,URL:https://github.com/ellzey/rpcap/wiki [retrieved on Aug. 16, 2016], 2 pgs.
Ellzey:"rpacp/rpacp-client.c at master.ellzey/rpacp.GitHub",Dec. 5, 2009(Dec. 5, 2009),XP055295642,Retrieved from the Internet:URL:https://github.cim/ellzey/rpcap/blob/master/rpcap-client.c[retrieved on Aug. 16, 2016], 6 pgs.
Anonymous:"5.7.Exporting data", Jul. 15, 2013(Jul. 15, 2013),XP055295639,Retrieved from the Internet:URL:https://web.archive.org/web/20130715070335/http://www.wireshark.org/docs/wsug_html_chunked/ChlOExportSection.html [retrieved on Aug. 16, 2016], 6 pgs.
International Search Report in international application No. PCT/CN2014/079824, dated Sep. 22, 2014, 2 pgs.
English Translation of the Written Opinion of the International Search Authority in international application No. PCT/CN2014/079824, dated Sep. 22, 2014, 7 pgs.
"rpcap/rpcap-server.c at master. WilliamSalusky/rpcap GitHub", Oct. 9, 2009, William Salusky,Retrieved from the Internet:URL:https://github.com/WilliamSalusky/rpcap/blob/master/rpcap-server.c, 6 pgs.
"Programming with pcap", Jan. 1, 2002, Tim Carstens, Retrieved from the Internet:URL:http://www.tcpdump.org/pcap.html, 10 Pgs.

* cited by examiner

PROCESSING METHOD AND APPARATUS FOR SIGNALING TRACING

TECHNICAL FIELD

The present disclosure relates to intelligent network technology and in particular to a processing method and apparatus for signalling tracing.

BACKGROUND

With the rapid development of the intelligent network, especially the rise of service systems based on the intelligent network, new requirements for the scale, reliability, universality and expandability of signalling tracing have been proposed.

In an existing method for signalling tracing, the tracing codes for each traced service are independent. If there is a new service needing the signalling tracing, then a tracing code needs to be rewritten to meet new requirements, and structure presentation information is stored into a database for searching in case that the information needs to be used. All tracing information will be outputted to a display interface for displaying when they are traced.

The existing method for signalling tracing has the following technical problems:

1) new tracing codes need to be set for new services, resulting in low scalability and maintainability;

2) it takes a long time to search the structure presentation information of a complex structure, which results in a poor user experience;

3) when all of the traced information is output to a display interface, it is prone to cause a hang up of the display interface, and even lead to a system crash since the amount of messages outputted is large.

SUMMARY

Embodiments of the present disclosure mainly provide a processing method and apparatus for signalling tracing so as to solve the problems in the related technique.

The technical solutions of the embodiments of the present disclosure are implemented as follows.

According to one aspect of embodiments of the present disclosure, a method for processing signalling tracing is provided, which includes:

a client reads a configuration file corresponding to a traced service; the client establishes a connection between the client and a server; the client registers with the traced service in the server based on the configuration file by sending a registration message to the server, and wherein the registration message includes registration information entered in a display interface by a user for the server determining an identity of the client; and, after registration is successful, the client receives a signalling tracing message fed back by the server about the traced service and the client outputs the signalling tracing message to the display interface, and the signalling tracing message includes information of an event happening in the traced service.

According to another aspect of embodiments of the present disclosure, a processing apparatus for signalling tracing is provided, which includes a memory for storing a configuration file and programming instructions and a processor, and wherein the processor is arranged to execute the programming instructions to perform steps comprising:

reading a configuration file corresponding to a traced service;

establishing a connection between the client and a server;

registering with the traced service in the server based on the configuration file by sending a registration message to the server, and wherein the registration message includes registration information entered in a display interface by a user for the server determining an identity of the client; and receiving a signalling tracing message fed back by the server about the traced service and output the signalling tracing message to the display interface, and the signalling tracing message includes tracing information of an event happening in the traced service.

According to the embodiments of the present disclosure provide a processing method and apparatus for signalling tracing, a client reads a configuration file corresponding to a traced service, establishes a connection with a server, the client registers with the traced service in the server based on the configuration file, receives a signalling tracing message fed back by the server about the traced service after registration is successful, and outputs the signalling tracing message to a display interface. Accordingly, scalability and reliability of a system can be improved. The signalling tracing for a traced service and the analysis and expansion of a signalling message can be completed by reading a configuration file corresponding to the traced service through the client.

DETAILED DESCRIPTION

In an embodiment of the present disclosure, a client reads a configuration file corresponding to a traced service, establishes a connection with a server, registers with the traced service in the server based on the configuration file, receives a signalling tracing message fed back by the server about the traced service after registration is successful, and outputs the signalling tracing message to a display interface.

The present disclosure is further explained below in detail with reference to drawings and specific embodiments.

Figure 1:
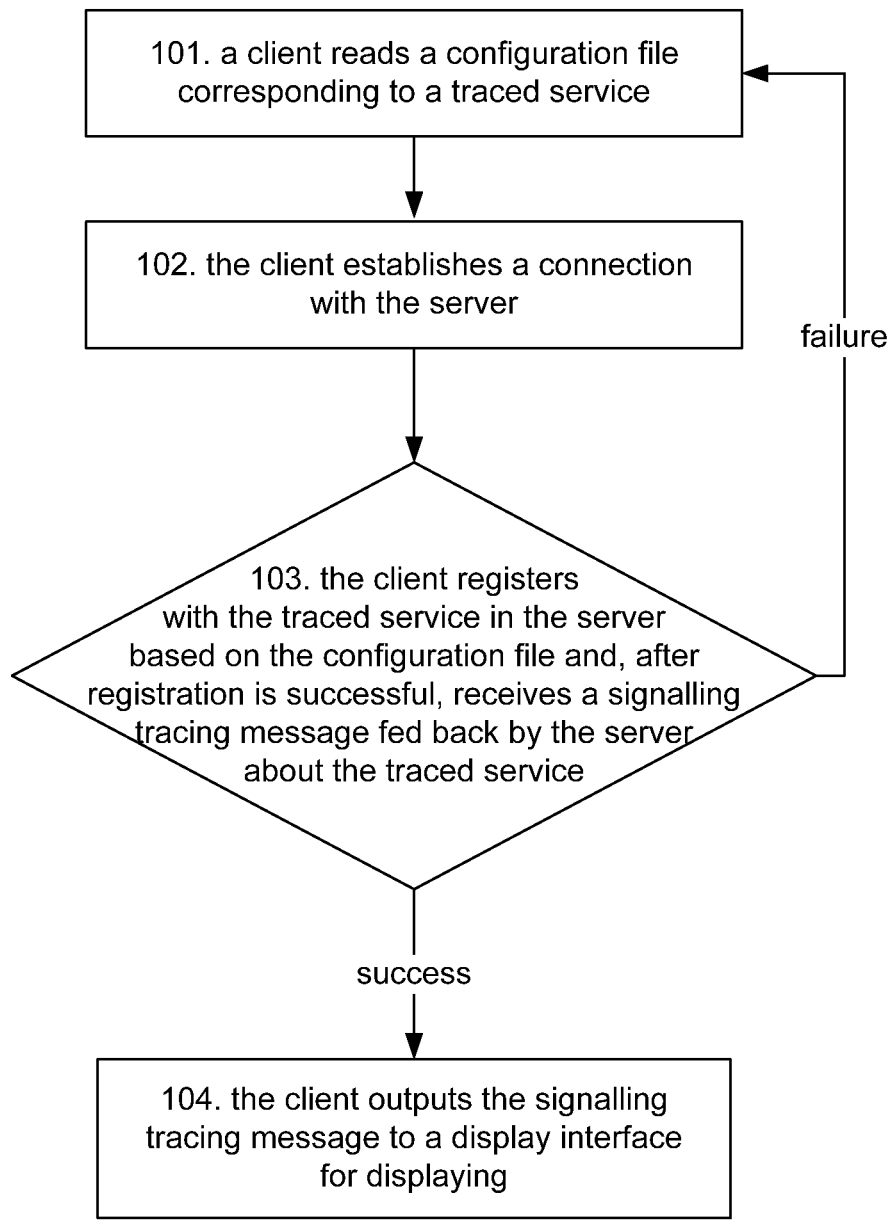
FIG. 1 is a flowchart of a method for processing signalling tracing according to an embodiment of the present disclosure.

An embodiment of the present disclosure implements a method for processing signalling tracing, as shown in FIG. 1, the method includes the following steps.

Step 101: a client reads a configuration file corresponding to a traced service.

In this step, when signalling tracing for the traced service is initiated by the client, the client searches whether a configuration file corresponding to the traced service exists in a specified directory where configuration files are stored. If the configuration file corresponding to the traced service exists in the specified directory, the configuration file is read by the client, and data in the configuration file is saved in memory. If the configuration file corresponding to the traced service does not exist in the specified directory, a configuration file corresponding to the traced service is created by the client. The specified directory may be any folder in the storage of the client, for example, the specified directory is a scheme folder.

The data in the configuration file includes information used to perform signalling tracing for the traced service, such as a service name, a service identifier, an event number, encoding and decoding information, and presentation information and so on.

The created configuration file is in an extensible markup language (XML) format, including information used to perform signalling tracing for the traced service, such as a service name, a service identifier, an event number, encoding and decoding information, and presentation information and so on.

The service name is a name of the traced service. The service identifier is a number of the traced service. The event number is an event number needed to be traced in the traced service. The encoding and decoding information is the encoding and decoding information corresponding to the traced service. The presentation information is setup information about output of information to a display interface.

Figure 2:
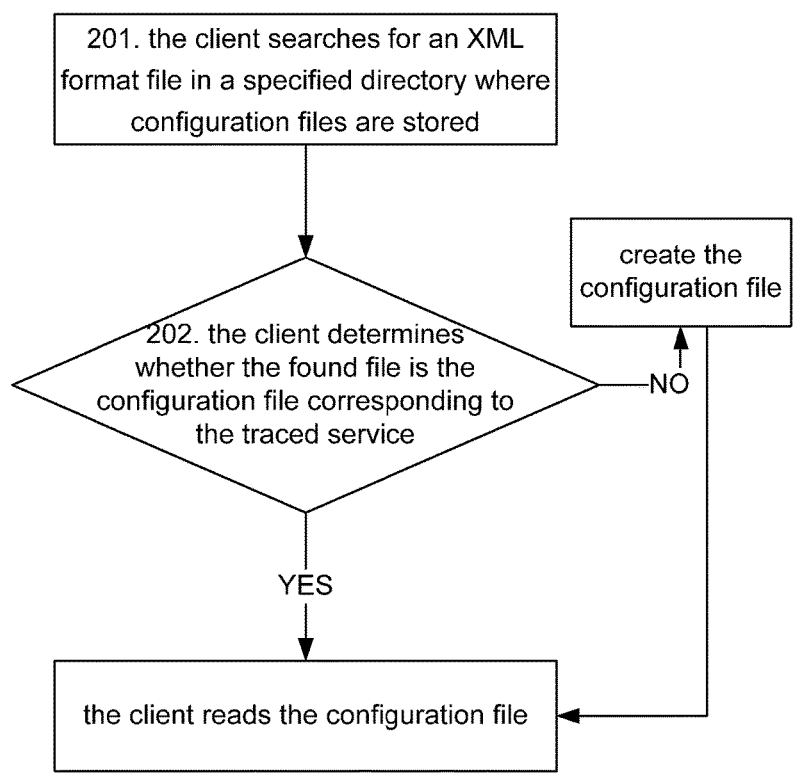
FIG. 2 is a flowchart of a process that a client searches a specified directory where configuration files are stored for a configuration file corresponding to a traced service from according to an embodiment of the present disclosure.

As shown in FIG. 2, the client searches whether a configuration file corresponding to a traced service exists in a specified directory where configuration files are stored. Specifically, the searching method includes:

Step 201: the client searches for an XML format file in the specified directory where configuration files are stored.

In this step, based on an exclusion list, the client searches the specified directory for an XML format file which is not included in the exclusion list. The exclusion list is a file list which will be first excluded when the client searches for an XML format file, the files included in the exclusion list may be files set in advance by a user, or files excluded by the client during the searching.

The client determines whether to refer to the exclusion list according to exclusion flag of the exclusion list. The client does not refer to the exclusion list when the exclusion flag indicates that the exclusion list is empty while the client refers to the exclusion list when the exclusion flag indicates that the exclusion list is not empty. The serial number of the exclusion flag is increased sequentially with the increase of excluded files, and the serial number of the exclusion flag is decreased sequentially with the reduction of excluded files.

For example, when the exclusion list is created and there are no files needed to be excluded, the exclusion flag of the exclusion list is 0. Each time a file needed to be excluded is added into the exclusion list, the serial number of the exclusion flag is increased by one. In this way, the exclusion flag of the exclusion list is updated dynamically by the client. When the exclusion list is created, the initial exclusion flag is 0 if the list is empty. In this case, the client reads the exclusion flag of the exclusion list and determines not to refer to the exclusion list when the exclusion flag is 0. When a file needed to be excluded is added into the exclusion list, the exclusion flag is updated to 1, and then the exclusion flag is updated to 2 when another file needed to be excluded is added into the exclusion list. In this case, the client reads the exclusion flag of the exclusion list and determines to refer to the exclusion list when the exclusion flag is 2.

The client determines whether the exclusion list is an empty list, and if it is empty, then the client searched for all of the files in the specified directory. If the exclusion list is not an empty list, then the client reads files in the exclusion list and marks the files in the specified directory which are the same as those in the exclusion list as non-searched files. Then format checking is performed on a file that is not marked as a non-searched file.

In this step, the client checks whether the suffix of the file that is not marked as a non-found file is .XML; if it is, the file is determined to be in an XML format. Then the file is opened and step 202 is executed. If the file is not in an XML format, the file is added into the exclusion list and the remaining files not marked as non-searched files are checked sequentially.

Step 202: the client determines whether the file found out is a configuration file corresponding to a traced service.

In this step, the client views whether there is data about the service name or service identifier in the found file. If there is, it can be determined that the found file is the configuration file. Then the client determines whether the service name or service identifier in the found file is consistent with information of the traced service; if consistent, then it can be determined that the found file is the configuration file corresponding to the traced service and the configuration file is read by the client; and if not consistent, then the search fails and the process returns to step 201. The upper limit of the number of times that the search fails is set. When the upper limit is reached, the configuration file corresponding to the traced service is created by the client.

Each time the search failure occurs, the serial number of the failure flag is increased by 1 by the client. The serial number of the failure flag is compared with the upper limit of the number of times that the search fails, and execution returns to step 201 if the failure flag is smaller than the upper limit of the number of times that the search fails, otherwise, the configuration file corresponding to the traced service is created by the client if the failure flag is greater than or equal to the upper limit of the number of times that the search fails.

When the client reads the configuration file, the data in the configuration file is read, and the data read from the configuration file is stored in the memory.

Before the client searches for the configuration file corresponding to a traced service, the client may determine whether signalling tracing for the traced service was initiated by searching a tracing history. The tracing history includes the service name of the traced service. After signalling tracing for the traced service is initiated by the client, and a signalling tracing message is received from the server, the service name of the traced service is saved in the tracing history. When signalling tracing for the traced service is initiated by the client next time, whether signalling tracing for the traced service has been initiated is determined by searching if the service name of the traced service exists in the tracing history. If signalling tracing for the traced service has been initiated, the configuration file corresponding to the traced service should be stored in the memory. The step 201 is performed to search for the configuration file. If signalling tracing for the traced service has not yet been initiated, the configuration file corresponding to the traced service needs to be created by the client and stored in the memory. Then the created configuration file is read by the client.

The client may be a computer in several service control points in an intelligent network.

The server may be a mobile terminal, a server, etc. in the intelligent network.

Step 102: the client establishes a connection with the server.

In this step, an interface configuration file is set in advance by the client and stored in the memory. The interface configuration file is in an XML format, including information for being displayed on a display interface, such as display frame information for entering connection information, display frame information for entering registration information and so on. The client reads the interface configuration file and outputs an interactive interface generated dynamically by the interface configuration file to the display interface. Equipment information and network information of the server is set by a user on the display interface. The client establishes a connection with the server based on the equipment information and network information.

The equipment information includes a physical MAC address, an equipment name, etc. The network information includes an IP address of the equipment, a connection mode, proxy connection information, etc. The connection mode may be a SOCKET connection mode, an HTTP protocol connection mode or an SSH connection mode. The proxy connection information includes a proxy type, a proxy server address, a port number, a username and a password.

When the client initiates a connection with the server, the server is determined according to the equipment information and network information set by the user, and a connection message is sent to the server according to the IP address, connection mode and proxy connection information set by the user. The connection message includes an IP address of the client. The connection message is received and read by the server, and then a feedback message is sent from the server to the IP address of the client. After the client receives the feedback message, it prompts the user through the display interface that a connection has been established between the client and the server. If no feedback message is received by the client, then it indicates that the client and the server fail to establish a connection successfully, the client prompts the user through the display interface to re-enter the equipment information and network information of the server and the connection message is re-sent to the server.

When the connection message is sent from the client to the server, a timer is activated by the client for time keeping. If the feedback message is received by the client before the timer reaches the pre-defined time, then the timer is reset and the client prompts the user through the display interface that a connection has been established between the client and the server. Otherwise, if no feedback message is received by the client when the timer reaches the pre-defined time, then the timer is reset and the client prompts the user through the display interface to re-enter the equipment information and network information of the server according to a failure instruction received and re-initiates a connection to the server.

Step 103: the client registers with the traced service in the server based on the configuration file and, after registration is successful, receives a signalling tracing message fed back by the server about the traced service.

In this step, the client packages registration information entered in the display interface by the user and the event number of the configuration file saved in the memory to generate a registration message based on the encoding and decoding information of the configuration file saved in the memory, and then sends the registration message to the server. The received registration message is decoded by the traced service in the server based on the encoding and decoding information set by the traced service itself. If the registration message can be decoded, then it indicates that the registration message is sent to the traced service, the registration message is read by the traced service and registration of the client is completed. The traced service sends a message that the registration is successful to the client through the server. After the message that the registration is successful is received by the client, the client waits to receive a signalling tracing message fed back by the server about the traced service. If the registration message cannot be decoded, then it indicates that the registration message is not sent to the traced service, and the registration of the client is cancelled by the traced service. When the message that the registration is successful is not received by the client in the predetermined waiting time, the step 101 is performed. The registration information includes information for the server to determine the identity of the client, such as user account and so on.

The timer is activated by the client for time keeping when the client sends the registration message to the equipment. If the message that the registration is successful is received by the client within the predetermined waiting time, then the timer is reset. If the message that the registration is successful is not received when the timer reaches the predetermined waiting time, then the timer is reset and the step 101 is performed.

When the event corresponding to the event number in the configuration file occur in the traced service, a signalling tracing message corresponding to the event is fed back by the server to the client. The client receives the signalling tracing message fed back by the server about the traced service, where the signalling tracing message is generated by encrypting and encapsulating the tracing information of the event happening in the traced service through the server.

Step 104: the client outputs the signalling tracing message to a display interface for displaying.

In this step, the received signalling tracing message is read and decoded by the client according to the structure presentation information stored in the memory. Formats of the tracing information decoded by the client are converted into an XML format based on struct header files of the C programming language. The converted messages are saved in the memory, and then outputted to the display interface.

The messages can be outputted to the display interface for paging display in order to prevent the amount of messages outputted from being too large, resulting in hang of the display interface or causing a system crash. As such, the presentation information in the created configuration file also needs to include the upper limit of the number of messages displayed in each page of the display interface. The tracing information obtained from decoding is divided into several pages according to the upper limit of the messages displayed in each page, and outputted to the display interface for paging display. For example, if there are 1000 tracing messages obtained from decoding while the upper limit of the number of messages displayed in each page set by the user is 100, then the tracing information obtained from decoding are divided into 10 pages by the client according to the upper limit of the number of messages displayed in each page set by the user, and the information is outputted to the display interface for displaying in 10 pages.

Figure 3:
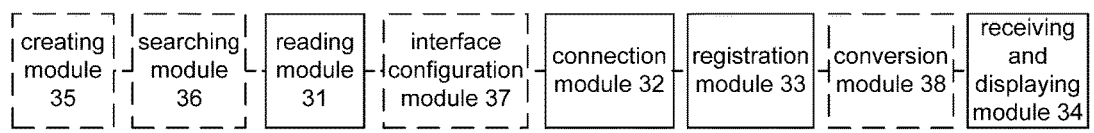
FIG. 3 is a schematic structural diagram of a processing apparatus for signalling tracing according to an embodiment of the present disclosure.

In order to implement the method mentioned above, an embodiment of the present disclosure also provides a processing apparatus for signalling tracing. The apparatus is provided in the client, as shown in FIG. 3, the apparatus includes a reading module 31, a connection module 32, a registration module 33 and a receiving and displaying module 34.

The reading module 31 is configured to read a configuration file corresponding to a traced service, and may be implemented as a host processor of the client.

The connection module 32 is configured to establish a connection between the client and the server, and may be implemented as a network adapter of the client.

The registration module 33 is configured to register with the traced service in the server based on the configuration file, and may be implemented as a host processor of the client.

The receiving and displaying module 34 is configured to receive a signalling tracing message fed back by the server about the traced service and output the signalling tracing message to a display interface, and may be implemented as a display adapter of the client.

The apparatus further includes a creating module 35, configured to create the configuration file corresponding to the traced service and save the configuration file in a specified directory. The host processor of the client may be adopted for implementing the creating module.

The apparatus further includes a searching module 36, configured to search for the configuration file corresponding to the traced service in the specified directory where the configuration files are stored. The searching module 36 is further configured to determine that a format of the configuration file is an XML format and determine that the configuration file is the configuration file corresponding to the traced service. The host processor of the client may be adopted for implementing the search module.

Specifically, when signalling tracing for the traced service is initiated by the client, the searching module 36 searches if a configuration file corresponding to the traced service exists in the specified directory. If the configuration file corresponding to the traced service exists in the specified directory, the configuration file is read, and data in the configuration file is saved in memory. If the configuration file corresponding to the traced service does not exist in the specified directory, a creating message is sent to the creating module 35. A configuration file corresponding to the traced service is created by creating module 35 based on the creating message. The specified directory may be any folder in the storage of the client, for example, the specified directory is a scheme folder.

The data in the configuration file includes information used to perform signalling tracing for the traced service, such as a service name, a service identifier, an event number, encoding and decoding information, and presentation information and so on.

The created configuration file is in an XML format, including information used to perform signalling tracing for the traced service, such as a service name, a service identifier, event number, encoding and decoding information, and presentation information and so on.

The service name is a name of the traced service. The service identifier is a number of the traced service. The event number is the event number needed to be traced in the traced service. The encoding and decoding information is the encoding and decoding information corresponding to the traced service. The presentation information is setup information about output of information to a display interface.

The reading module 31 is further configured to read the interface configuration file set in advance and output an interactive interface generated dynamically by the interface configuration file to the display interface.

The searching module 36 is configured to search for a XML format file in the specified directory where the configuration files are stored. Based on an exclusion list, the searching module 36 searches the specified directory for the XML format file which is not included in the exclusion list. The exclusion list is a file list which is first excluded when searching for the XML format file, the files included in the exclusion list may be files set in advance by a user, or files excluded during the searching. The searching module 36 is further configured to determine whether to refer to the exclusion list according to an exclusion flag of the exclusion list. It is determined to not refer to the exclusion list when the exclusion flag indicates that the exclusion list is empty. It is determined to refer to the exclusion list when the exclusion flag indicates that the exclusion list is not empty. The exclusion flag is increased in serial number sequentially with the increase of excluded files, and the exclusion flag is decreased in serial number sequentially with the reduction of excluded files.

For example, when the exclusion list is created and there is no file needed to be excluded, the exclusion flag of the exclusion list is 0. Each time a file needed to be excluded is added into the exclusion list, the exclusion flag is increased by one in serial number. In this way, the exclusion flag of the exclusion list is updated dynamically by the searching module 36. When the exclusion list is created, the initial exclusion flag is 0 if the list is empty. In this case, the exclusion flag of the exclusion list is read, and it is determined not to refer to the exclusion list when the exclusion flag is 0. When a file needed to be excluded is added into the exclusion list, the exclusion flag is updated to 1, and the exclusion flag is then updated to 2 when another file needed to be excluded is added into the exclusion list. In this case, after the exclusion flag of the exclusion list is read, it is determined to refer to the exclusion list when the exclusion flag is 2.

The searching module 36 is configured to determine whether the exclusion list is an empty list, and if it is empty, then the specified directory is searched for all of the files therein. If the exclusion list is not an empty list, then files in the exclusion list are read and files in the specified directory which are the same as those in the exclusion list are marked as non-searched files. Then format checking is performed on a file that is not marked as a non-searched file.

The searching module 36 is further configured to check if the file that is not marked as a non-searched file is in an XML format, and check whether the suffix of the found file is .XML or not, and if it is, determine the file is in an XML format. Then the file is opened and whether the found file is the configuration file corresponding to the traced service is determined; if it is not the configuration file, then add the file into the exclusion list and check the remaining files not marked as non-searched files sequentially.

Determining whether the found file is the configuration file corresponding to the traced service specifically includes: viewing whether there is data about the service name or service identifier in the found file. If there is, it can be determined that the found file is the configuration file. Then whether the service name or service identifier in the found file is consistent with information of the traced service is determined; if consistent, it can be determined that the found file is the configuration file corresponding to the traced service and the configuration file is sent to the reading module 31 for reading; if not consistent, then the search fails and the specified directory is searched again for files. The upper limit of the number of times that the search fails is set. When the upper limit is reached, a creating message is sent to the creating module 35. The creating module 35 creates the configuration file corresponding to the traced service according to the creating message.

Each time the search failure occurs, failure flag is increased by 1 in serial number. The failure flag is compared with the upper limit of the number of times that the search fails, re-searching the files in the specified directory if the failure flag is smaller than the upper limit of the number of times that the search fails, otherwise the creating message is sent to the creating module 35 if the failure flag is greater than or equal to the upper limit of the number of times that the search fails. The creating module 35 creates the configuration file corresponding to the traced service according to the creating message.

The searching module 36 is further configured to determine whether signalling tracing for the traced service was initiated by searching a tracing history. The tracing history includes the service name of the traced service. When signalling tracing for the traced service is initiated, whether signalling tracing for the traced service was initiated is determined by searching if the service name of the traced service exists in the tracing history. If the signalling tracing for the traced service was initiated, the configuration file corresponding to the traced service was saved in the memory. The specified directory is searched for files. If the signalling tracing for the traced service has not yet been initiated, a creating message needs to be sent to the creating module 35. The configuration file corresponding to the traced service is created by the creating module 35 according to the creating message and stored in the memory. Then the created configuration file is read by the reading module 31.

The receiving and displaying module 34 is configured to save the service name of the traced service in the tracing history after receiving the signalling tracing message fed back by the server.

The apparatus further includes an interface configuration module 37, configured to set an interface configuration file in advance and store the interface configuration file in the memory. A display adapter of the client may be adopted for implementing the interface configuration module. The interface configuration file is in an XML format, including information for being displayed in the display interface, such as display frame information for entering connection information, display frame information for entering registration information and so on. An interactive interface generated dynamically by the interface configuration file is outputted to the display interface. Equipment information and network information of the server is set by a user in the display interface. The client establishes a connection with the server based on the equipment information and network information.

The equipment information includes information for determining equipment, such as a physical MAC address, an equipment name, etc. The network information includes information for connecting with the equipment, such as an IP address of the equipment, a connection mode, proxy connection information, etc. The connection mode may be a a SOCKET connection mode, an HTTP protocol connection mode or an SSH connection mode. The proxy connection information includes a proxy type, a proxy server address, a port number, a username and a password.

The connection module 32 is configured to determine the server according to the equipment information and network information set by the user when a connection to the server is established. A connection message is sent to the server according to the IP address, connection mode and proxy connection information set by the user. The connection message includes an IP address of the client. The connection message is received and read by the server, and then a feedback message is sent from the server to the IP address of the client. After the connection module 32 receives the feedback message, it prompts the user that a connection has been established with the server through the interface configuration module 37. If no feedback message is received by the connection module 32, then it indicates that the client and the server fail to establish a connection successfully, the user is prompted to re-enter the equipment information and network information of the server through the interface configuration module 37 and the connection to the server is initiated again.

The connection module 32 is further configured to activate a timer for time keeping when the connection message is sent to the server. If the feedback message is received before the timer reaches the pre-defined time, then the timer is reset and the user is prompted through the interface configuration module 37 that a connection has been established with the server. Otherwise, if no feedback message is received when the timer reaches the pre-defined time, the timer is reset and the user is prompted through the interface configuration module 37 to re-enter the equipment information and network information of the server according to failure instruction received and a connection to the server is initiated again.

The registration module 33 is configured to package the registration information entered in the display interface by the user and the event number of the configuration file saved in the memory to generate a registration message based on the encoding and decoding information of the configuration file saved in the memory. Then the registration message is sent to the server. The received registration message is decoded by the traced service in the server based on the encoding and decoding information set by the traced service itself. If the registration message can be decoded, then it indicates that the registration message is sent to the traced service, the registration message is read by the traced service and registration of the client is completed. The traced service sends a message that the registration is successful to the client through the server. After the message that the registration is successful is received by the client, the client waits to receive a signalling tracing message fed back by the traced service in the server. If the registration message cannot be decoded, then it indicates that the registration message is not sent to the traced service, and the registration of the client is cancelled by the traced service. When the message that the registration is successful is not received by the client in the predetermined waiting time, a message is sent to the reading module 31. The registration information includes information for the server to determine the identity of the client, such as user account and so on.

The registration module 33 is further configured to activate the timer for time keeping when sending the registration message to the equipment. If the message that the registration is successful is received within the predetermined waiting time, then the timer is reset. If the message that the registration is successful is not received when the timer reaches the predetermined waiting time, then the timer is reset and a message is sent to the reading module 31.

The apparatus further includes a conversion module 38, configured to convert the format of the signalling tracing message received by the receiving and displaying module 34 into an XML format based on struct header files of the C programming language and send the message to the receiving and displaying module 34. The host processor of the client may be adopted for implementing the conversion module.

The receiving and displaying module 34 is configured to receive the signalling tracing message fed back by the server about the traced service. The signalling tracing message is decoded according to the structure presentation information of the configuration file stored in the memory. Formats of the tracing information obtained after decoding are converted into an XML format by the conversion module 38. The messages are saved in the memory, and then the messages are outputted to the display interface. The signalling tracing message is generated by encrypting and encapsulating the tracing information of the event triggered in the traced service through the server when the event corresponding to the event number in the configuration file is triggered in the traced service.

The messages can be outputted to the display interface for paging display in order to prevent the amount of messages outputted from being too large, resulting in hang of the display interface or causing a system crash. As such, the presentation information in the configuration file created by the creating module 35 also needs to include the upper limit of the number of messages displayed in each page of the display interface. The tracing information obtained from decoding are divided into several pages according to the upper limit of the number of messages displayed in each page, and outputted to the display interface for paging display. For example, if the number of tracing messages obtained from decoding is 1000 and the upper limit of the number of messages displayed in each page set by the user is 100, then the tracing information obtained from decoding are divided into 10 pages by the client according to the upper limit of the number of messages displayed in each page set by the user, and the information is outputted to the display interface for displaying in 10 pages.

What described are merely preferable embodiments of the present disclosure and are not intended to limit the scope of protection of the present disclosure.

The invention claimed is:

1. A method for processing signalling tracing, comprising:
reading, by a client, a configuration file corresponding to a traced service, and wherein data in the configuration file at least includes encoding and decoding information;
establishing, by the client, a connection between the client and a server;
generating, by the client, a registration message by packaging registration information and an event number of the traced service based on the encoding and decoding information;
registering with, by the client, the traced service in the server based on the configuration file by sending the registration message to the server;
receiving, by the client, a signalling tracing message of the traced service fed back by the server after the registration is successful, and wherein the signalling tracing message includes tracing information of an event happening in the traced service; and
outputting, by the client, the signalling tracing message to a display interface.

2. The method according to claim 1, further comprising: before reading, by the client, the configuration file corresponding to the traced service,
creating, by the client, the configuration file corresponding to the traced service and saving, by the client, the created configuration file in a specified directory.

3. The method according to claim 1, further comprising: before reading, by the client, the configuration file corresponding to the traced service,
searching for, by the client, the configuration file corresponding to the traced service in a specified directory where configuration files are saved.

4. The method according to claim 1, further comprising: before establishing, by the client, the connection between the client and the server,
reading, by the client, an interface configuration file set in advance and outputting an interactive interface generated dynamically by the interface configuration file to the display interface.

5. The method according to claim 1, further comprising: after receiving, by the client, the signalling tracing message fed back by the server,
converting, by the client, a format of the received signalling tracing message into an extensible markup language (XML) format.

6. The method according to claim 1, wherein the configuration file includes information used to perform signalling tracing for the traced service, and the information used to perform signalling tracing for the traced service includes a service name of the traced service, a service identifier of the traced service, the event number of the traced service, the encoding and decoding information, and presentation information of the traced service.

7. The method according to claim 1, wherein the configuration file includes an upper limit of the number of messages displayed in each page of the display interface and a structure of presentation information, and the outputting, by the client, the signalling tracing message to the display interface comprises:
decoding, by the client, the signalling tracing message according to the structure of presentation information in the configuration file to obtain the tracing information; and
dividing, by the client, the tracing information into several pages according to the upper limit displayed in each page.

8. An apparatus for processing signalling tracing, comprising a memory for storing a configuration file and programming instructions and a processor, and wherein the processor is arranged to execute the programming instructions to perform actions comprising:
reading a configuration file corresponding to a traced service, and wherein data in the configuration file at least includes encoding and decoding information;
establishing a connection between a client and a server;
generating, by the client, a registration message by packaging registration information and an event number of the traced service based on the encoding and decoding information;
registering with the traced service in the server based on the configuration file by sending the registration message to the server;
receiving a signalling tracing message fed back by the server about the traced service, and wherein the signalling tracing message includes tracing information of an event happening in the traced service; and
outputting the signalling tracing message to a display interface.

9. The apparatus according to claim 8, wherein the processor is arranged to execute the programming instructions to perform actions further comprising:
creating the configuration file corresponding to the traced service and saving the created configuration file in a specified directory.

10. The apparatus according to claim 8, wherein the processor is arranged to execute the programming instructions to perform actions further comprising:
searching for the configuration file corresponding to the traced service in a specified directory where configuration files are saved.

11. The apparatus according to claim 8, wherein the processor is arranged to execute the programming instructions to perform actions further comprising:
reading an interface configuration file set in advance; and
outputting an interactive interface generated dynamically by the interface configuration file to the display interface.

12. The apparatus according to claim 8, wherein the processor is arranged to execute the programming instructions to perform actions further comprising:
converting a format of the signalling tracing message received into an extensible markup language (XML) format.

13. The apparatus according to claim 8, wherein the configuration file includes information used to perform signalling tracing for the traced service, and the information used to perform signalling tracing for the traced service includes a service name of the traced service, a service identifier of the traced service, the event number of the traced service, the encoding and decoding information, and presentation information of the traced service.

14. The apparatus according to claim 8, wherein the configuration file includes an upper limit of the number of messages displayed in each page of the display interface and a structure of presentation information, and wherein the processor is arranged to execute the programming instructions to perform actions further comprising:
decoding the signalling tracing message according to the structure of presentation information in the configuration file to obtain the tracing information; and
dividing the tracing information into several pages according to the upper limit displayed in each page.

15. A method for processing signalling tracing, comprising:
searching for, by the client, the configuration file corresponding to the traced service in a specified directory where configuration files are saved;
reading, by a client, a configuration file corresponding to a traced service, and wherein data in the configuration file at least includes encoding and decoding information;
establishing, by the client, a connection between the client and a server;
registering with, by the client, the traced service in the server based on the configuration file by sending a registration message to the server, and wherein the registration message is encoded according to the encoding and decoding information in the configuration file;
receiving, by the client, a signalling tracing message of the traced service fed back by the server after the registration is successful, and wherein the signalling tracing message includes tracing information of an event happening in the traced service; and
outputting, by the client, the signalling tracing message to a display interface.

16. The method according to claim 15, further comprising: before reading, by the client, the configuration file corresponding to the traced service,
creating, by the client, the configuration file corresponding to the traced service and saving, by the client, the created configuration file in the specified directory.

17. The method according to claim 15, further comprising: before establishing, by the client, the connection between the client and the server,
reading, by the client, an interface configuration file set in advance and outputting an interactive interface generated dynamically by the interface configuration file to the display interface.

18. The method according to claim 15, further comprising: after receiving, by the client, the signalling tracing message fed back by the server,
converting, by the client, a format of the received signalling tracing message into an extensible markup language (XML) format.

19. The method according to claim 15, wherein the configuration file includes information used to perform signalling tracing for the traced service, and the information used to perform signalling tracing for the traced service includes a service name of the traced service, a service identifier of the traced service, an event number of the traced service, the encoding and decoding information, and presentation information of the traced service.

20. The method according to claim 15, wherein the configuration file includes an upper limit of the number of messages displayed in each page of the display interface and a structure of presentation information, and the outputting, by the client, the signalling tracing message to the display interface comprises:
decoding, by the client, the signalling tracing message according to the structure of presentation information in the configuration file to obtain the tracing information; and dividing, by the client, the tracing information into several pages according to the upper limit displayed in each page.

* * * * *